(12) United States Patent
Arai

(10) Patent No.: US 10,602,112 B2
(45) Date of Patent: Mar. 24, 2020

(54) IMAGE PROCESSING APPARATUS

(71) Applicant: Olympus Corporation, Hachioji-shi, Tokyo (JP)

(72) Inventor: Hirozumi Arai, Tokyo (JP)

(73) Assignee: Olympus Corporation, Tokyo (JP)

(*) Notice: Subject to any disclaimer, the term of this patent is extended or adjusted under 35 U.S.C. 154(b) by 9 days.

(21) Appl. No.: 15/968,727

(22) Filed: May 1, 2018

(65) Prior Publication Data

US 2018/0367776 A1 Dec. 20, 2018

(30) Foreign Application Priority Data

Jun. 14, 2017 (JP) .................. 2017-116737

(51) Int. Cl.
| | | |
|---|---|---|
| H04N 5/235 | (2006.01) | |
| H04N 5/232 | (2006.01) | |
| H04N 9/64 | (2006.01) | |
| H04N 1/60 | (2006.01) | |
| H04N 1/54 | (2006.01) | |
| H04N 9/79 | (2006.01) | |

(52) U.S. Cl.
CPC .......... *H04N 9/7921* (2013.01); *H04N 1/54* (2013.01); *H04N 1/60* (2013.01); *H04N 5/23229* (2013.01); *H04N 5/23245* (2013.01); *H04N 9/64* (2013.01); *H04N 9/646* (2013.01); *H04N 5/2351* (2013.01)

(58) Field of Classification Search
CPC .......... H04N 9/7921; H04N 5/23245; H04N 5/23229; H04N 9/646; H04N 9/64; H04N 5/2351; H04N 1/6002; H04N 1/6005; H04N 1/6008; H04N 1/6019; H04N 1/6025; H04N 1/6027; H04N 1/6041; H04N 1/6055; H04N 1/6075; H04N 1/6077; H04N 1/60
See application file for complete search history.

(56) References Cited

U.S. PATENT DOCUMENTS

| | | | | |
|---|---|---|---|---|
| 2003/0026607 A1* | 2/2003 | Okisu | ............... | H04N 5/23245 396/213 |
| 2004/0076337 A1* | 4/2004 | Nishida | ............ | G06K 9/38 382/274 |
| 2007/0030284 A1* | 2/2007 | Ogasawara | ......... | G09G 3/2003 345/589 |
| 2008/0075384 A1* | 3/2008 | Chung | ............ | G06T 5/008 382/274 |
| 2018/0120534 A1* | 5/2018 | Mohri | ............ | G02B 7/282 |

FOREIGN PATENT DOCUMENTS

| | | | | |
|---|---|---|---|---|
| GB | 2429598 A | * | 2/2007 | ............ H04N 5/202 |
| JP | 2006-301149 | | 11/2006 | |
| JP | 2013-236307 | | 11/2013 | |

* cited by examiner

*Primary Examiner* — Abdelaaziz Tissire
(74) *Attorney, Agent, or Firm* — John C. Pokotylo; Pokotylo Patent Services

(57) ABSTRACT

An image processing apparatus 100 includes: an analysis range indicating section 23 that indicates an analysis range that is a range, on a screen of captured-image data, that has a brightness higher than a predetermined brightness; a color analysis section 24 that analyzes a color included in the analysis range; a color correction instructing section 25 that gives an instruction to perform a color correction, on the basis of the color analysis; and an image generator 50 that corrects the captured-image data on the basis of the color correction instruction, so as to generate a corrected image.

13 Claims, 24 Drawing Sheets

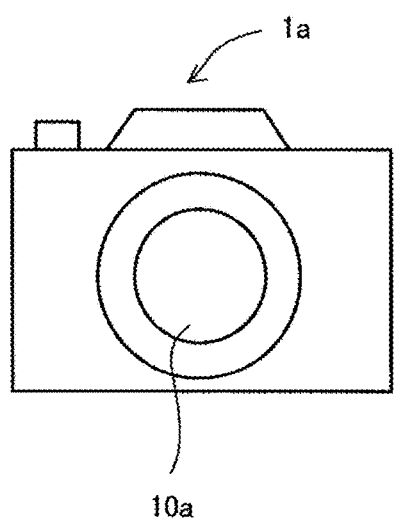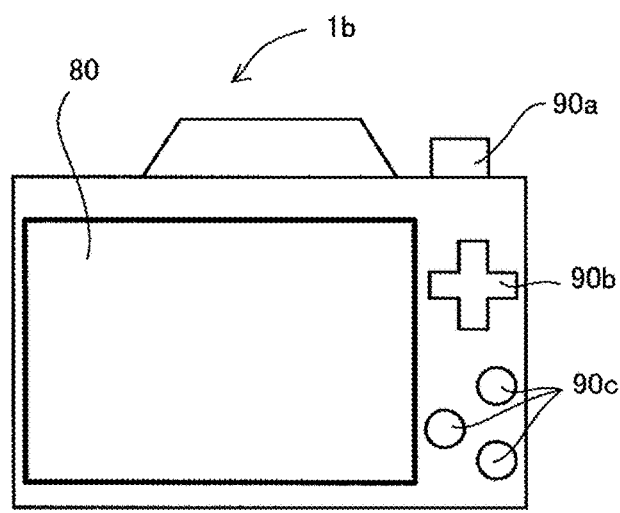
FIG. 1A                    FIG. 1B

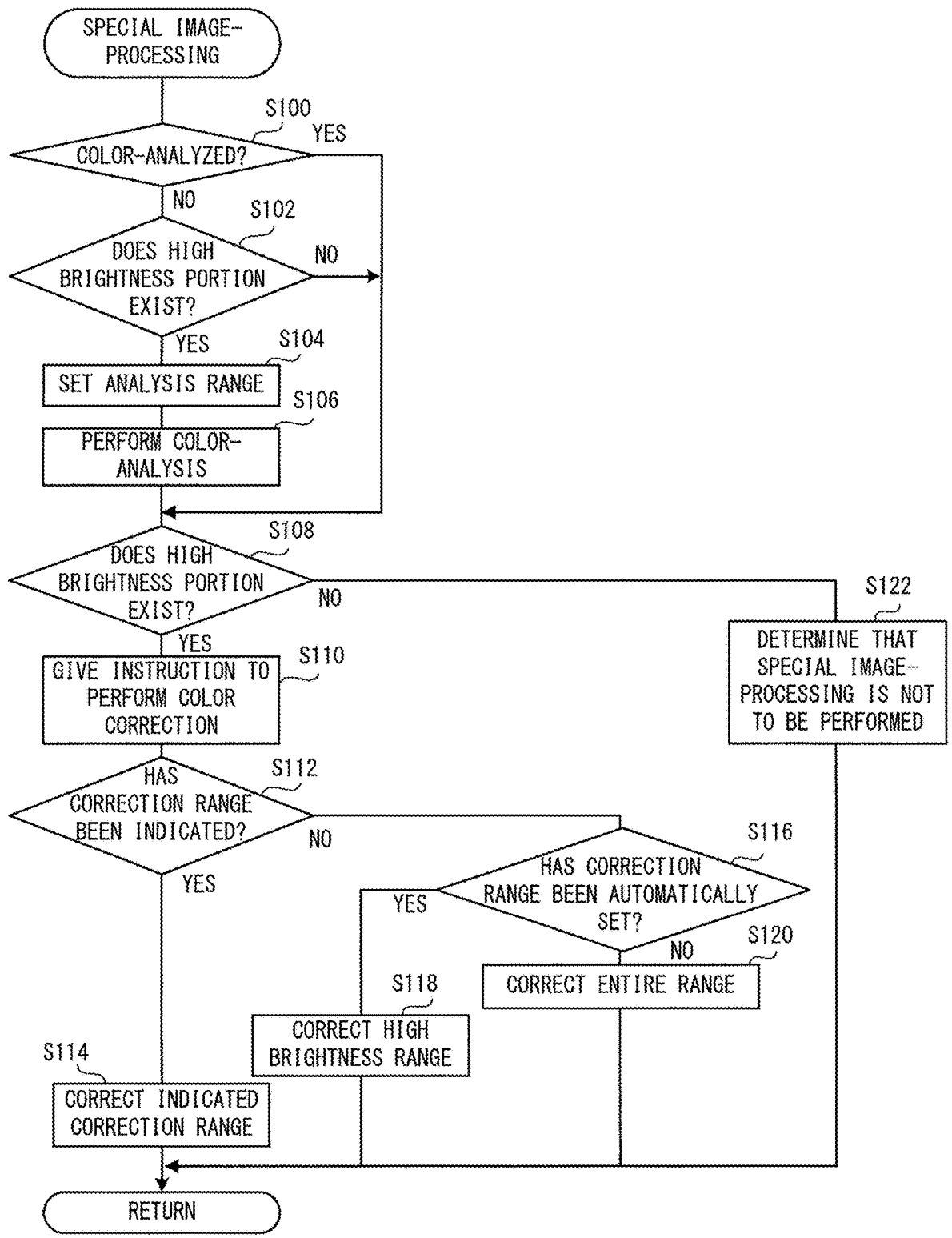
F I G. 5

REGION DIVISION DIAGRAM

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |

FIG. 7

AVERAGE BRIGHTNESS VALUE OF BLOCK

| 40 | 50 | 32 | 41  | 40  | 37  | 29  | 38 | 53 |
|----|----|----|-----|-----|-----|-----|----|----|
| 41 | 34 | 12 | 13  | 160 | 195 | 148 | 39 | 44 |
| 31 | 28 | 21 | 156 | 195 | 197 | 196 | 26 | 27 |
| 28 | 35 | 30 | 164 | 195 | 198 | 165 | 35 | 36 |
| 37 | 38 | 39 | 40  | 130 | 115 | 43  | 44 | 45 |
| 30 | 47 | 48 | 49  | 50  | 51  | 52  | 53 | 49 |
| 33 | 44 | 50 | 58  | 40  | 20  | 36  | 29 | 53 |
| 38 | 44 | 41 | 31  | 45  | 32  | 29  | 50 | 44 |

F I G. 8

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |

F I G. 9

HUE DIAGRAM

HUE RANGE TABLE

| COLOR | H RANGE |
|---|---|
| Y | 145~174 |
| Or | 115~144 |
| R | 85~114 |
| RP | 55~84 |
| P | 25~54 |
| PB | 0~24, 355~360 |
| B | 325~354 |
| CB | 295~324 |
| C | 265~294 |
| GC | 235~264 |
| G | 205~234 |
| GY | 175~204 |

AREA OF HIGH BRIGHTNESS BLOCK N

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |

F I G. 1 1 A

COLOR ANALYSIS DIAGRAM (No. 24)

| R | R | R | R | R | R | R | R |
|---|---|---|---|---|---|---|---|
| R | R | R | R | R | R | R | R |
| R | R | R | R | RP | R | R | R |
| R | R | R | R | R | RP | R | R |
| RP | RP | R | R | R | R | R | R |
| R | R | R | R | R | R | R | R |
| R | R | R | R | R | R | R | R |
| R | R | R | R | R | R | R | R |

M

F I G. 1 1 B

COLOR ANALYSIS DIAGRAM (No. 42)

M

| R | R | R | R | R | R | R | R |
|---|---|---|---|---|---|---|---|
| R | R | R | R | R | R | R | R |
| R | R | R | R | R | R | Or | Or |
| R | R | R | R | Or | Or | B | B |
| B | B | B | B | B | B | B | B |
| B | B | B | B | B | B | B | B |
| B | B | B | B | B | B | B | B |
| B | B | B | B | B | B | B | B |

F I G. 1 1 C

ANALYSIS RESULT TABLE

| R  | 704 |
|----|-----|
| B  | 200 |
| RP | 16  |
| Or | 16  |

F I G. 1 2

COLOR CORRECTION TABLE 1

| COLOR | CORRECTION AMOUNT |
|---|---|
| Or | ENHANCEMENT+ 2 |
| R | ENHANCEMENT+ 2 |
| RP | ENHANCEMENT+ 1 |
| B | DECREASE- 1 |
| OTHERS | NO CORRECTION |

COLOR CORRECTION TABLE 2

| COLOR | CORRECTION AMOUNT | |
|---|---|---|
| | BRIGHTNESS VALUE 100~149 | BRIGHTNESS VALUE ≥150 |
| Or | ENHANCEMENT+ 2 | ENHANCEMENT+ 1 |
| R | ENHANCEMENT+ 2 | ENHANCEMENT+ 1 |
| RP | ENHANCEMENT+ 1 | ENHANCEMENT+ 1 |
| B | DECREASE- 1 | DECREASE- 2 |
| OTHERS | NO CORRECTION | NO CORRECTION |

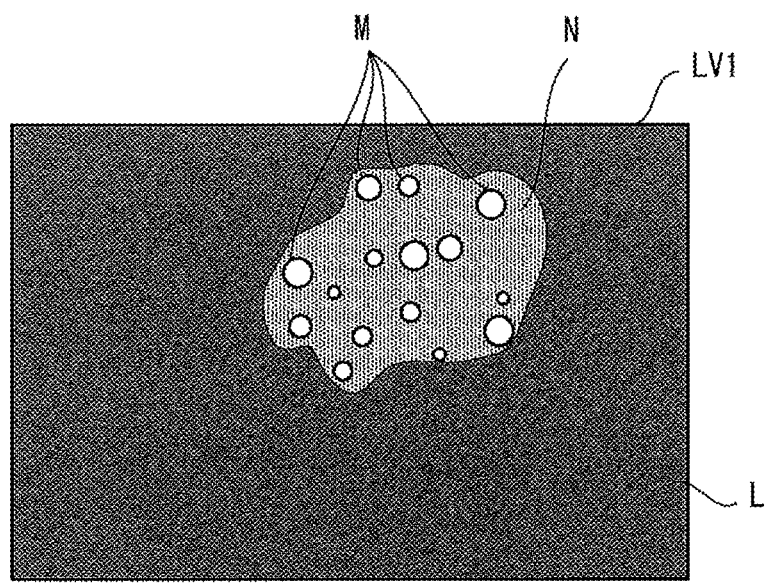
F I G. 1 5 A
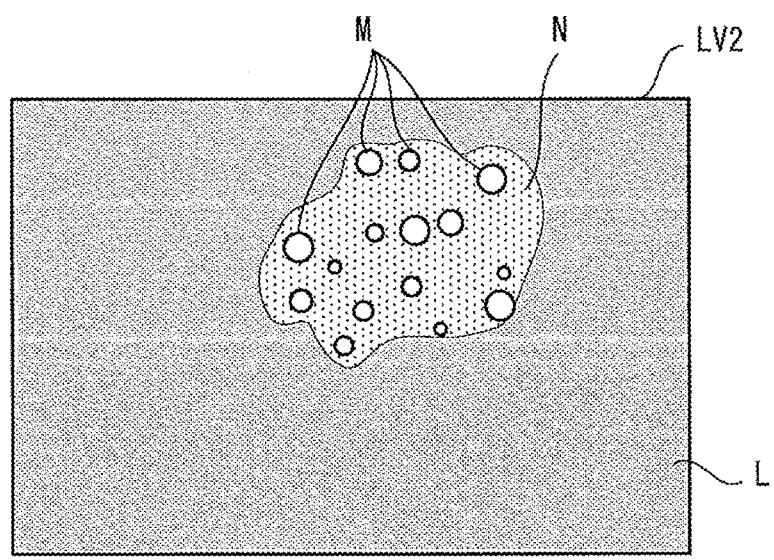
F I G. 1 5 B

AVERAGE BRIGHTNESS VALUE OF BLOCK

| 20 | 20 | 32 | 21 | 20 | 27 | 29 | 25 | 28 |
|---|---|---|---|---|---|---|---|---|
| 19 | 24 | 40 | 39 | 52 | 42 | 45 | 23 | 22 |
| 20 | 28 | 44 | 44 | 50 | 41 | 44 | 32 | 20 |
| 28 | 36 | 47 | 43 | 43 | 42 | 54 | 46 | 20 |
| 17 | 35 | 44 | 48 | 46 | 48 | 33 | 35 | 16 |
| 18 | 27 | 41 | 52 | 47 | 43 | 49 | 28 | 17 |
| 17 | 24 | 39 | 43 | 55 | 40 | 42 | 29 | 18 |
| 15 | 22 | 25 | 21 | 17 | 23 | 29 | 23 | 25 |

F I G. 1 8 A

BRIGHTNESS VALUE TABLE

| | BRIGHTNESS VALUE |
|---|---|
| NOT SHADED | ≤ 30 |
| ▨ | 31～40 |
| ▓ | ≥ 41 |

F I G. 1 8 B

AREA OF HIGH BRIGHTNESS BLOCK

COLOR ANALYSIS REGION (No. 57)

COLOR ANALYSIS DIAGRAM (No. 57)

BRIGHTNESS VALUE RANGE

COLOR ANALYSIS RESULT

| B | 300 |
|---|---|
| GY | 200 |
| PB | 148 |

AREA OF HIGH BRIGHTNESS BLOCK
| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
F I G. 2 1 A
COLOR ANALYSIS REGION (No. 59)
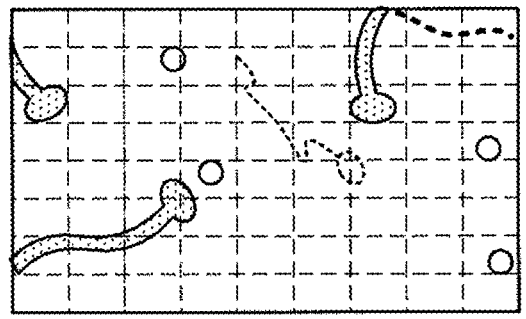
F I G. 2 1 B
COLOR ANALYSIS DIAGRAM (No. 59)
| B | B | B | B | B | B | GY | PB | PB |
|---|---|---|---|---|---|---|---|---|
| GY | B | GY | B | PB | B | GY | B | B |
| GY | B | B | B | PB | B | GY | B | B |
| B | B | B | B | PB | PB | B | B | GY |
| B | B | B | GY | B | B | PB | B | B |
| B | B | GY | B | B | B | B | B | B |
| GY | GY | B | B | B | B | B | B | GY |
| B | B | B | B | B | B | B | B | B |
F I G. 2 1 C

BRIGHTNESS VALUE RANGE

| | BRIGHTNESS VALUE ≥ 41 |
|---|---|

F I G. 2 2 A

COLOR ANALYSIS RESULT

| B | 1000 |
|---|---|
| GY | 600 |
| PB | 272 |

F I G. 2 2 B

COLOR CORRECTION TABLE 3

| COLOR | CORRECTION | |
|---|---|---|
| | BRIGHTNESS VALUE 31~40 | BRIGHTNESS VALUE ≥ 41 |
| GY | ENHANCEMENT +1 | ENHANCEMENT +2 |
| OTHER COLORS | NO CORRECTION | |

F I G. 2 3 A

COLOR CORRECTION TABLE 4

| COLOR | CORRECTION | |
|---|---|---|
| | BRIGHTNESS VALUE 31~40 | BRIGHTNESS VALUE ≥ 41 |
| GY | ENHANCEMENT +2 | ENHANCEMENT +1 |
| OTHER COLORS | NO CORRECTION | |

F I G. 2 3 B

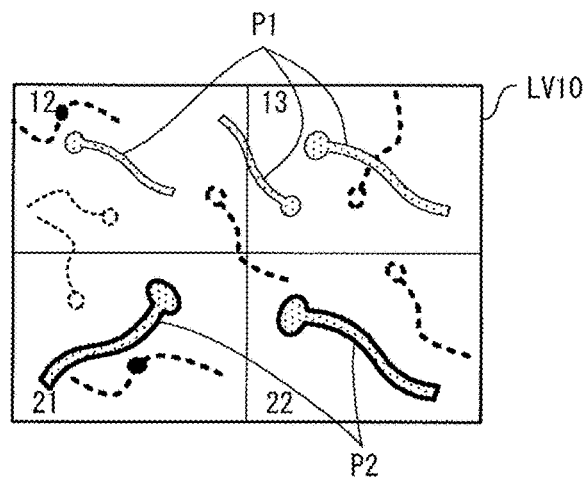
F I G. 24A
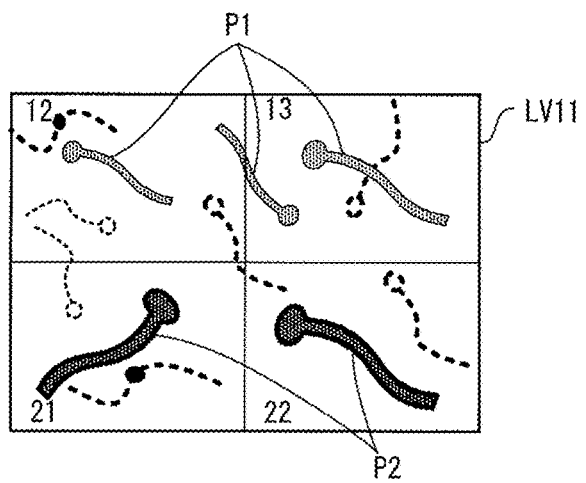
F I G. 24B
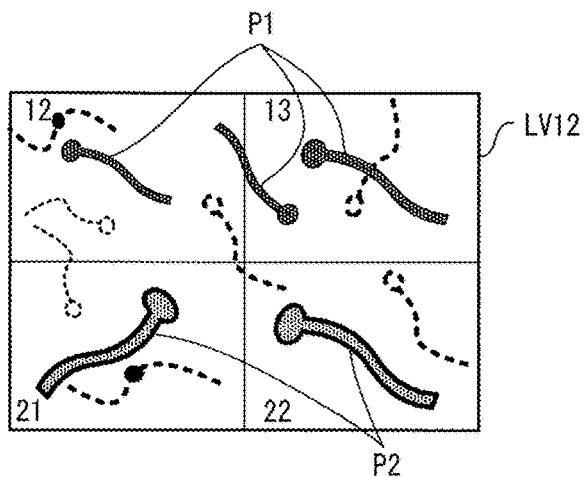
F I G. 24C

IMAGE PROCESSING APPARATUS

CROSS-REFERENCE TO RELATED APPLICATIONS

This application is based upon and claims the benefit of priority of the prior Japanese Patent Application No. 2017-116737, filed on Jun. 14, 2017, the entire contents of which are incorporated herein by reference.

BACKGROUND OF THE INVENTION

Field of the Invention

The present invention relates to image processing that improves recognition of a subject by accentuating a specific color.

Description of the Related Art

A commonly used digital camera is provided with an infrared cutoff filter in its lens portion in order to cut off unnecessary infrared light. Thus, there is a problem in which it is difficult to sufficiently reproduce H-alpha light (red) included in, for example, a red galaxy when astrophotographing is performed. There is an enthusiastic photographer who removes an infrared cutoff filter from a camera when he/she performs astrophotographing. A camera has been proposed that is provided with a removable infrared cutoff filter for photographing a red galaxy so that the infrared cutoff filter can be removed from the camera when astrophotographing is performed (Patent Document 1).

Patent Document 1: Laid-open Patent Publication No. 2006-301149

SUMMARY OF THE INVENTION

An image processing apparatus according to the present embodiment includes: an analysis range indicating section that indicates an analysis range that is a range, on a screen of captured-image data, that has a brightness higher than a predetermined brightness; a color analysis section that analyzes a color included in the indicated analysis range and outputs a result of the color analysis; a color correction instructing section that gives an instruction to perform a color correction, on the basis of the color analysis result; and an image generator that corrects the captured-image data on the basis of the color correction instruction, so as to generate a corrected image.

BRIEF DESCRIPTION OF THE DRAWINGS

FIGS. 1A and 1B are external views of an image capturing apparatus according to an embodiment of the present invention;

FIG. 5 illustrates a subroutine for explaining a procedure of special image-processing;

FIG. 7 illustrates a region division of the live view image of FIG. 6;

FIG. 8 illustrates an average brightness value of each block that is displayed on the region division diagram of FIG. 7;

FIG. 9 illustrates an area of a high brightness block that is displayed on the region division diagram of FIG. 7;

FIGS. 11A to 11C illustrate color analysis that is performed by a color analysis section with respect to the live view image of FIG. 6;

FIG. 12 is an analysis result table in which a total number of regions for which a representative color has been calculated by color analysis;

FIGS. 14A and 14B illustrate examples of color correction tables;

FIGS. 15A and 15B schematically illustrate effects of a color correction in a live view image;

FIGS. 18A and 18B illustrate an average brightness value of each block that is displayed on the region division diagram of FIG. 17;

FIGS. 21A to 21C illustrate color analysis performed with respect to a high brightness block having an average brightness value not less than 41;

FIGS. 22A and 22B are diagrams for explaining a result of the color analysis with respect to a high brightness block having an average brightness value not less than 41;

FIGS. 23A and 23B illustrate examples of color correction tables that are used when microscope photographing is performed; and FIGS. 24A to 24C schematically illustrate effects in a corrected image when microscope photographing is performed.

DETAILED DESCRIPTION OF THE PREFERRED EMBODIMENTS

Figure 2:
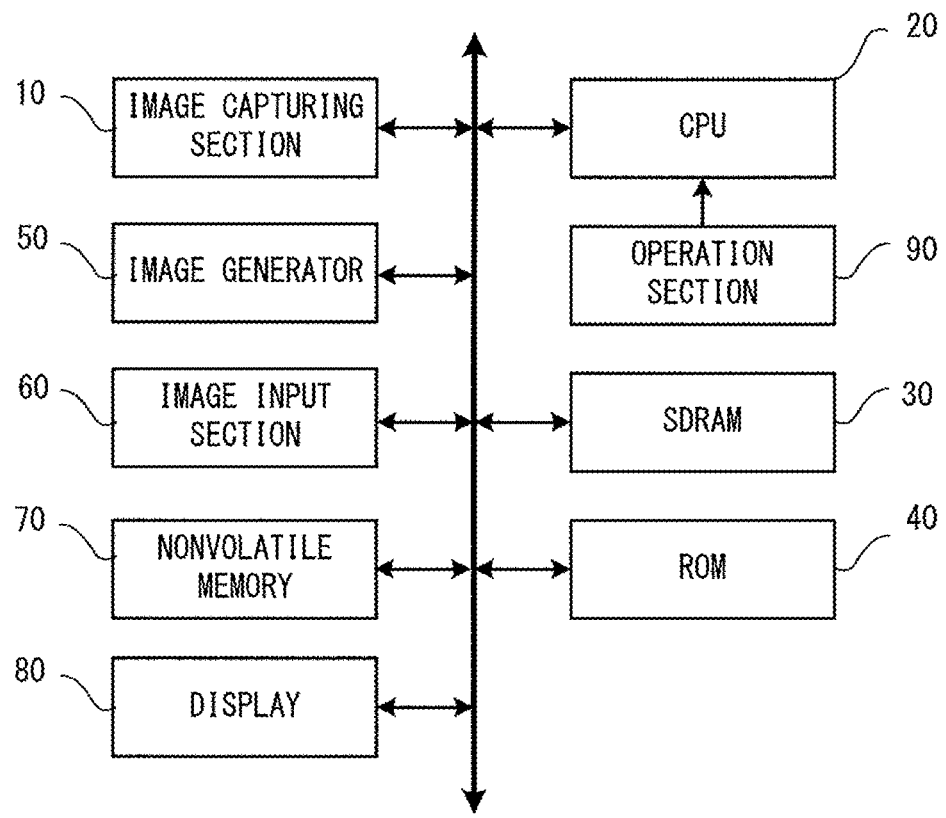
FIG. 2 is a hardware block diagram of the image capturing apparatus.

Embodiments of the present invention will now be described with reference to the drawings. FIGS. 1A and 1B are external views of an image capturing apparatus 1 according to an embodiment of the present invention. FIG. 1A illustrates the image capturing apparatus 1 as viewed from the front, and FIG. 1B illustrates the image capturing apparatus 1 as viewed from the back. FIGS. 1A and 1B illustrate a so-called digital camera as an example of the image capturing apparatus 1, but of course the image capturing apparatus 1 may be a camera built into, for example, a smartphone or a portable device. Further, there is no need to configure an image capturing section and an image processing section in the image capturing apparatus 1 to be one device, and the image capturing apparatus 1 may be an image capturing system in which the image capturing section and the image processing section are separate devices.

The image capturing apparatus 1a is a front of the image capturing apparatus 1. The image capturing apparatus 1b is a back of the image capturing apparatus 1. The image capturing apparatus 1 includes a lens section 10a in the center of its front surface. The image capturing apparatus 1 includes a display 80 and an operation section 90 on its back surface. The operation section 90 includes a release button 90a, a directional pad (D-pad) 90b, and an operation button 90c.

FIG. 2 is a hardware block diagram of the image capturing apparatus 1. The image capturing apparatus 1 includes an image capturing section 10, a central processing unit (CPU) 20, a synchronous dynamic random access memory (SDRAM) 30, a ROM 40, an image generator 50, an image input section 60, a nonvolatile memory 70, the display 80, and the operation section 90.

The image capturing section 10 captures an image of a subject and outputs captured-image data. In addition to the lens section 10a, the image capturing section 10 includes, for example, an imaging element, a signal processor, an analog-to-digital (AD) conversion section, and a lens driving section that are not illustrated.

The CPU 20 reads a control program from the ROM 40 and executes the read control program, so as to perform an overall control of the entire image capturing apparatus 1. The SDRAM 30 temporarily stores various data such as captured-image data. The ROM 40 stores a control program and various tables. The ROM 40 is, for example, a flash memory. The ROM 40 may be a removable memory (such as an SD card).

On the basis of captured-image data, the image generator 50 generates a live view image (also referred to as a display image) that is displayed on the display 80, or a still image that is saved and stored in the nonvolatile memory 70. The image generator 50 performs image processing such as an interpolation process, a white balance process, and a color conversion process that converts RGB data in the imaging element into YC data.

Further, when an instruction to perform a color correction is given to the image generator 50 by a color correction instructing section 25 described later, the image generator 50 corrects the captured-image data on the basis of the color correction instruction so as to generate a corrected image. When the color correction instruction is not given to the image generator 50 by the color correction instructing section 25, the image generator 50 performs usual image-processing. In the following description, image processing, including a color correction, is referred to as special image-processing, an instruction to perform the color correction being given by the color correction instructing section 25. Further, the image generator 50 also performs compression processing and uncompression processing with respect to an image on which usual image-processing or special image-processing has been performed.

The image input section 60 inputs captured-image data stored in the nonvolatile memory 70. The image input section 60 may input captured-image data from the outside by performing a wired or wireless communication. The nonvolatile memory 70 is, for example, a flash memory or a hard disk. The nonvolatile memory 70 may be a removable memory (such as an SD card).

The display 80 displays, for example, a live view image generated by the image generator 50, a still image stored in the nonvolatile memory 70, and photographing information or a photographing guide. The display 80 is constituted of a display panel and a control circuit, the display panel being a display panel that is a combination of an LCD and a backlight or being constituted of organic EL. The operation section 90 is an input section used by a photographer to input an instruction. The operation section 90 includes, for example, the release button 90a, the D-pad 90b, and the operation button 90c described above.

Figure 3:
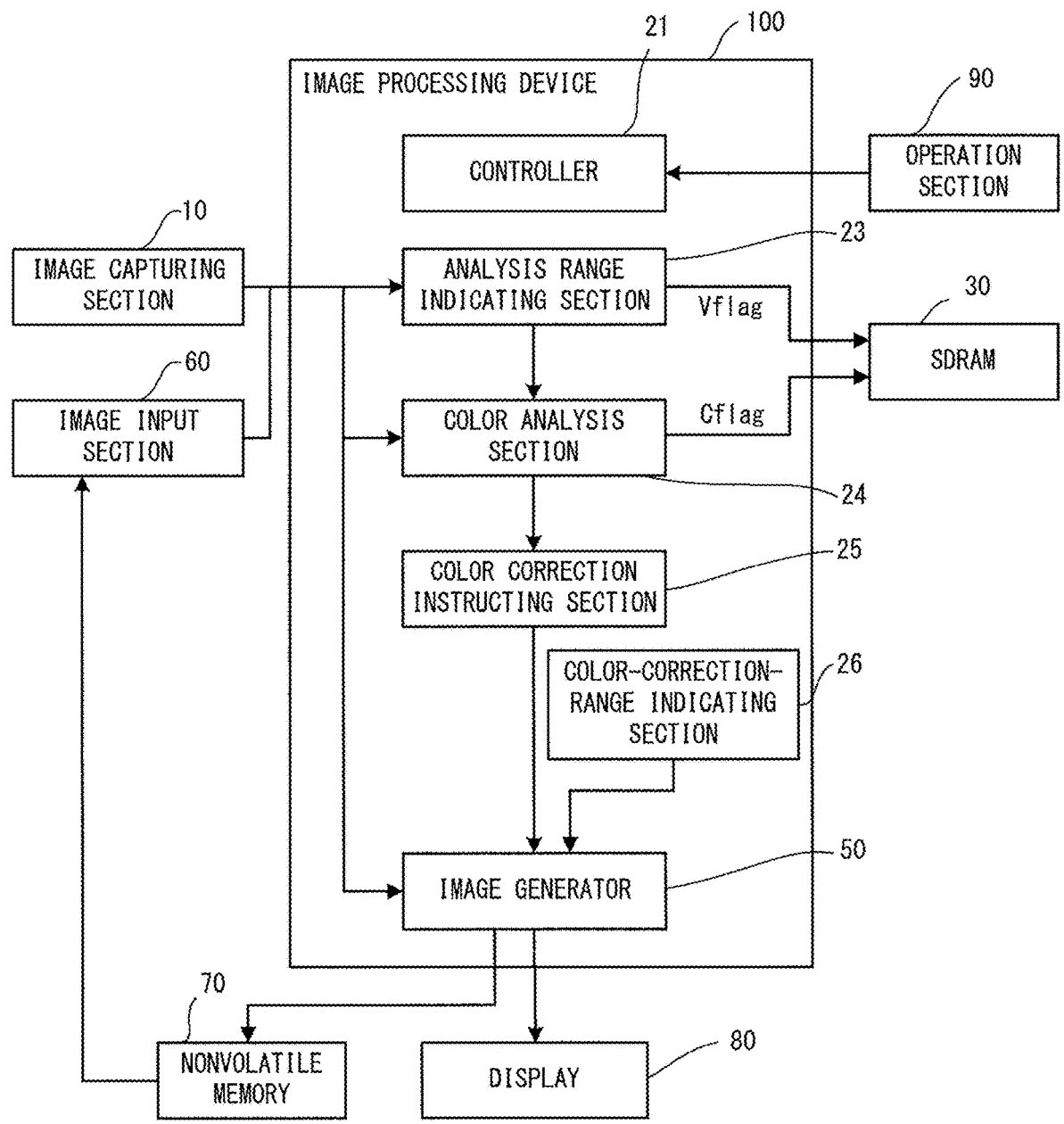
FIG. 3 is a functional block diagram related to color correction processing.

FIG. 3 is a functional block diagram related to color correction processing performed in the image capturing apparatus 1. An entire block in which color correction is performed on captured-image data is also referred to as an image processing device 100. The image processing device 100 includes a controller 21, an analysis range indicating section 23, a color analysis section 24, the color correction instructing section 25, a color-correction-range indicating section 26, and the image generator 50. The controller 21, the analysis range indicating section 23, the color analysis section 24, the color correction instructing section 25, and the color-correction-range indicating section 26 are provided by, for example, the CPU 20 performing software processing, the CPU 20 being a CPU that has read a control program.

Further, each of the analysis range indicating section 23, the color analysis section 24, the color correction instructing section 25, and the color-correction-range indicating section 26 may be implemented by a hardware circuit using an IC constituted of, for example, a gate array. In this case, the analysis range indicating section 23 is referred to as an analysis range indicating circuit, the color analysis section 24 is referred to as a color analysis circuit, the color correction instructing section 25 is referred to as a color correction instructing circuit, and the color-correction-range indicating section 26 is referred to as a color-correction-range indicating circuit.

Furthermore, the image generator 50 may be provided by, for example, the CPU 20 performing software processing, or it may be implemented by a hardware circuit, the CPU 20 being a CPU that has read a control program. When the image generator 50 is implemented by a hardware circuit, the image generator 50 is referred to as an image generation circuit.

The controller 21 controls the entire image capturing apparatus 1. For example, the analysis range indicating section 23, the color analysis section 24, the color correction instructing section 25, the color-correction-range indicating section 26, and the image generator 50 are controlled by the controller 21.

Further, the controller 21 sets various conditions for, for example, the image capturing section 10 according to a selected photographing mode. When at least one of an astrophotographing mode and a microscope photographing mode is selected as a photographing mode, the controller 21 operates the image processing device 100 so as to perform special image-processing. A mode for a long exposure photographing at a high ISO speed is set in the astrophotographing mode. For the microscope photographing mode, a high-magnification zoom lens is selected and a closeup position is set as a focal position. In the astrophotographing mode, color correction processing in which a spectrum color of a star is accentuated is performed, so as to improve recognition of the star. In the microscope photographing mode, a specific color is accentuated so as to recognize a specific microorganism or sample clearly.

On the basis of captured-image data, the analysis range indicating section 23 detects a range, on a screen, that has a brightness value greater than a predetermined brightness value. The analysis range indicating section 23 detects such a range in order to determine the position of a main subject. The captured-image data is input to the analysis range indicating section 23 from the image capturing section 10 or the image input section 60.

First, the analysis range indicating section 23 divides captured-image data into blocks on a screen. The analysis range indicating section 23 calculates an average brightness value for each block obtained by the division, and extracts a block having an average brightness value that is greater than a predetermined brightness value that has been set in advance. For example, the analysis range indicating section 23 extracts a block whose average brightness value is represented with 8 bits and is not less than 100. The analysis range indicating section 23 indicates the extracted block with a large average brightness value to the color analysis section 24 as an analysis range. The block with a large average brightness value is also referred to as a high brightness block.

Further, the analysis range indicating section 23 sets, in the SDRAM 30, an analysis range flag (V flag) indicating that there exists an analysis range. For example, when at least one high brightness block has been found on a whole screen, the analysis range indicating section 23 changes the analysis range flag (V flag) in the SDRAM 30 from 0 to 1.

The color analysis section 24 analyzes a color included in a high brightness block indicated by the analysis range indicating section 23. The color analysis section 24 analyzes a type of color included in a high brightness block, and counts the number of regions for each color. Specifically, the color analysis section 24 further divides a high brightness block into smaller regions, calculates a color that is representative of each region obtained by the division, and counts, for each color, the number of regions for which a representative color has been calculated. The color analysis section 24 outputs, to the color correction instructing section 25 and as a color analysis result, a representative color and the number of regions for which the representative color has been calculated. This will be described in detail in Step S106 of FIG. 5.

Further, the color analysis section 24 sets, in the SDRAM 30, a flag indicating "color-analyzed" (C flag) that indicates that color analysis has been performed. When the color analysis has been completed, the color analysis section 24 changes the flag indicating "color-analyzed" from 0 to 1. Further, when the image capturing apparatus 1 has been powered off, the color analysis section 24 resets the flag indicating "color-analyzed" to 0.

On the basis of a color analysis result, the color correction instructing section 25 instructs the image generator 50 to perform a color correction. Specifically, on the basis of a color analysis result, the color correction instructing section 25 refers to a color correction table so as to set a color to be corrected and a correction amount, and instructs the image generator 50 to perform color correction processing (special image-processing). The color to be corrected and the correction amount are also referred to as color correction parameters.

The color-correction-range indicating section 26 indicates, to the image generator 50, a color correction range on which a color correction is to be performed. Specifically, when a color correction range is indicated on the display 80, the color-correction-range indicating section 26 determines the indicated range as a color correction range. When the display 80 is provided with a touch panel (that is included in the operation section 90), the color correction range may be indicated directly by a touch manipulation. When the color-correction-range indicating section 26 indicates the color correction range to the image generator 50, the image generator 50 performs color correction processing on the indicated range.

Further, when the color-correction-range indicating section 26 has not indicated the range to the image generator 50 and when a setting in which a range is automatically indicated has been performed, the image generator 50 performs color correction processing on an analysis range (a high brightness block) indicated by the analysis range indicating section 23. The setting in which a range is automatically indicated is performed on, for example, a menu screen in advance. When the color-correction-range indicating section 26 has not indicated the range to the image generator 50 and when the setting in which a range is automatically indicated has not been performed, the image generator 50 performs color correction processing over an entire range of a screen.

In addition to performing usual processes, such as an interpolation process, on captured-image data, the image generator 50 performs a color correction on the captured-image data according to an instruction given by the color correction instructing section 25 and the color-correction-range indicating section 26, so as to generate a corrected image. The image generator 50 outputs the generated corrected image to the display 80. The corrected image is displayed on the display 80.

When a photographing instruction has been given through the release button 90a, the controller 21 also records the corrected image corrected by the image generator 50 in the nonvolatile memory 70. As described above, when the photographing mode is not an astrophotographing mode or when no high brightness blocks have been detected, the image generator 50 does not perform color correction processing and performs usual image-processing.

Figure 4:
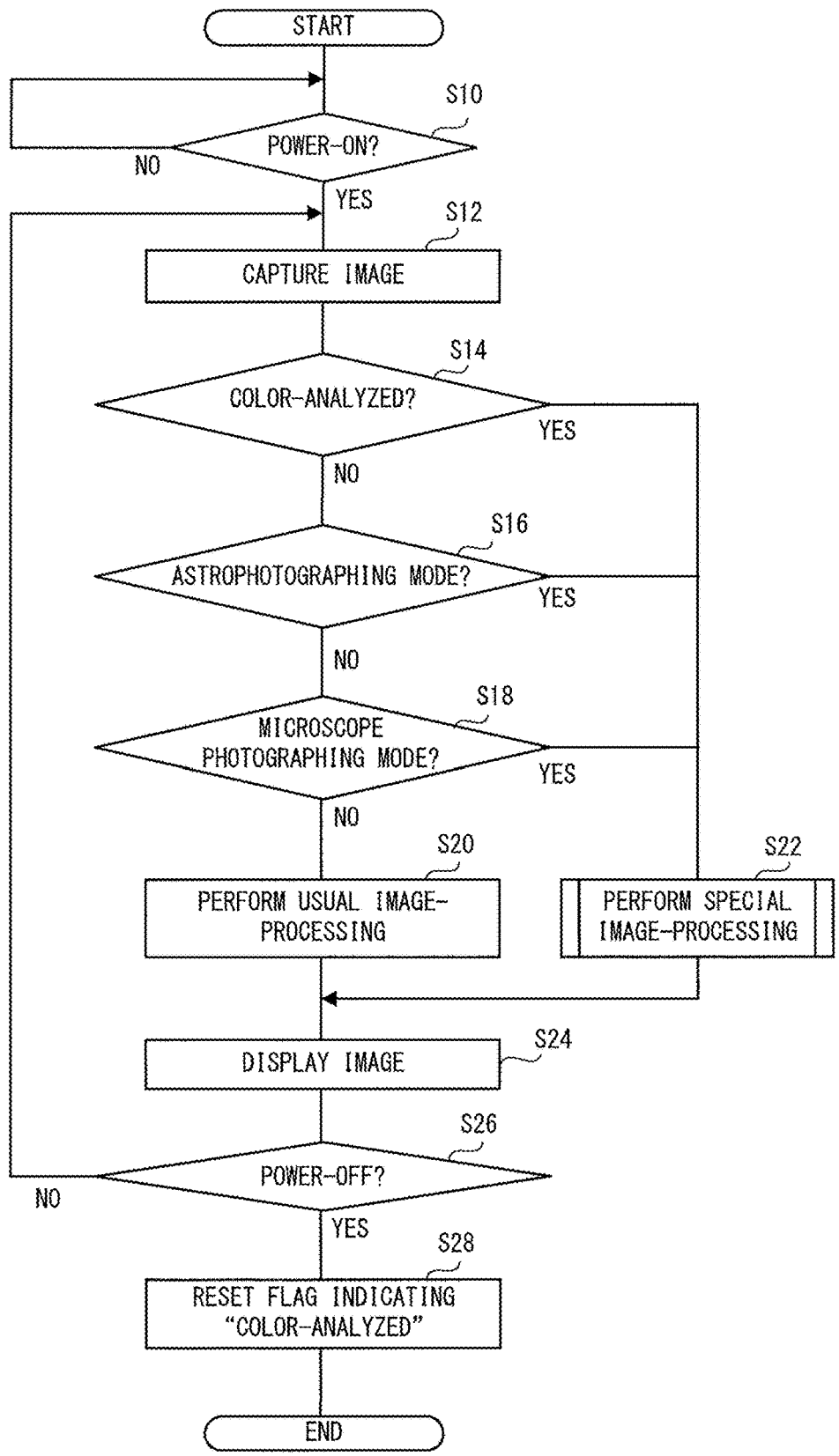
FIG. 4 is a flowchart that illustrates a procedure of color correction processing.

FIG. 4 is a flowchart that illustrates a procedure of color correction processing. Under the control of the controller 21, the color correction processing in FIG. 4 is performed by, for example, the analysis range indicating section 23, the color analysis section 24, the color correction instructing section 25, the color-correction-range indicating section 26, and the image generator 50.

The controller 21 determines whether a power-on manipulation has been performed by a photographer (Step S10). When the controller 21 has determined that the power-on manipulation has not been performed (NO in Step S10), the controller 21 loops the process of Step S10. When the controller 21 has determined that the power-on manipulation has been performed (YES in Step S10), the image capturing section 10 captures an image of a subject (Step S12). The image input section 60 may read captured-image data stored in the nonvolatile memory 70 instead of data of an image captured by the image capturing section 10. Further, the image input section 60 may input captured-image data from the outside using a communication device.

The controller 21 determines whether captured-image data has been color-analyzed (Step S14). The controller 21 determines whether a flag indicating "color-analyzed" (C flag) is 1. As described above, the flag indicating "color-analyzed" (C flag) is a flag indicating whether color analysis has been performed, and is stored in the SDRAM 30. The flag indicating "color-analyzed" (C flag) is 1 when captured-image data or input captured-image data has been color-analyzed. The flag indicating "color-analyzed" (C flag) is reset to 0 when the power is turned off, as explained later in the description of Step S28, but the flag indicating "color-analyzed" (C flag) may be reset to 0 when a specific button in the operation section 90 has been depressed or when it has been detected that the orientation of the image capturing apparatus 1 has been changed. The reason is that it is possible to perform color correction processing again when an intention of a photographer or a photographing screen has been changed.

When the controller 21 has determined that the captured-image data has not been color-analyzed (NO in Step S14), the controller 21 determines whether the photographing mode is an astrophotographing mode (Step S16). When the controller 21 has determined that the photographing mode is not the astrophotographing mode (NO in Step S16), the controller 21 determines whether the photographing mode is a microscope photographing mode (Step S18). When the controller 21 has determined that the photographing mode is not the microscope photographing mode (NO in Step S18), the image generator 50 performs usual image-processing that does not include color correction processing.

When the controller 21 has determined that the captured-image data has been color-analyzed (YES in Step S14), the image generator 50 performs special image-processing (Step S22). When the controller 21 has determined, in Step S16, that the photographing mode is the astrophotographing mode (YES in Step S16), the astrophotographing mode is set in the image capturing apparatus 1. Then, the image generator 50 performs special image-processing (Step S22). When the controller 21 has determined, in Step S18, that the photographing mode is the microscope photographing mode (YES in Step S18), the microscope photographing mode is set in the image capturing apparatus 1. Then, the image generator 50 performs special image-processing (Step S22).

The controller 21 displays an image generated by usual image-processing (Step S20) or by special image-processing (Step S22) as a live view image (Step S24). When a photographing instruction is given, the controller 21 records the generated image in the nonvolatile memory 70.

The controller 21 determines whether the image capturing apparatus 1 has been powered off (Step S26). When the controller 21 has determined that the image capturing apparatus 1 has not been powered off (NO in Step S26), the process returns to Step S12. When the controller 21 has determined that the image capturing apparatus 1 has been powered off (YES in Step S26), the controller 21 resets the flag indicating "color-analyzed" (C flag) from 1 to 0, and terminates the processing.

FIG. 5 illustrates a subroutine for explaining a procedure of special image-processing. Using a flag indicating "color-analyzed" (C flag), the controller 21 determines whether captured-image data has been color-analyzed (Step S100). When the controller 21 has determined that the captured-image data has been color-analyzed (YES in Step S100), the process moves on to Step S108.

When the controller 20 has determined that the captured-image data has not been color-analyzed (NO in Step S100), the controller 21 causes the analysis range indicating section 23 to detect a high brightness portion, so as to determine whether the captured-image data has a high brightness portion (Step S102).

Specifically, the analysis range indicating section 23 divides an entire screen into a plurality of blocks, and calculates an average brightness value for each block. The analysis range indicating section 23 extracts a block (a high brightness block) having an average brightness value greater than a predetermined brightness value that has been set in advance.

When the controller 21 has determined, from a result of the analysis performed by the analysis range indicating section 23, that the captured-image data has, for example, at least one high brightness block (YES in Step S102), the analysis range indicating section 23 sets the extracted high brightness block to be an analysis range (Step S104).

Figure 6:
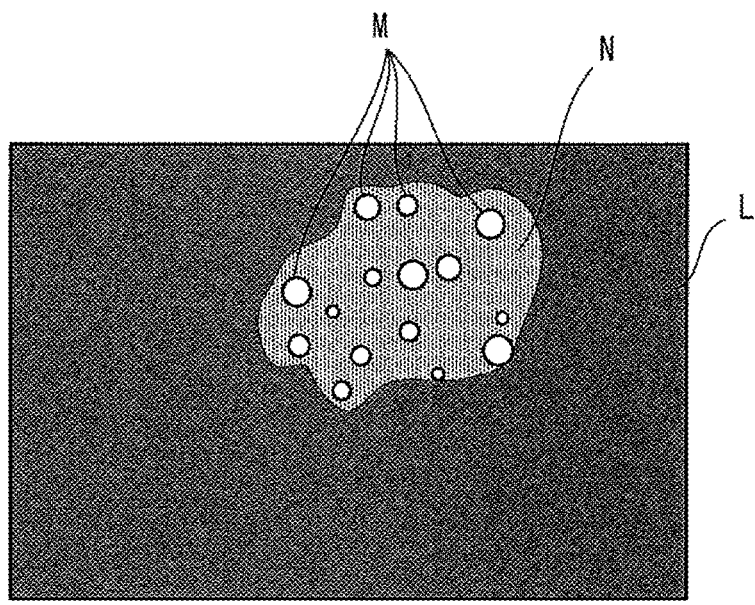
FIG. 6 illustrates an example of a live view image when astrophotographing is performed.

A specific procedure of extracting a high brightness block using the analysis range indicating section 23 is described. FIGS. 6 to 9 are diagrams for explaining a procedure of extracting a high brightness block. FIG. 6 is an example of a live view image when astrophotographing is performed, the live view image being displayed on the display 80. A plurality of white circles on a screen represent stars M. A shaded portion that exists around the stars M represents a galaxy N. L is a background. An infrared cutoff filter is provided in a photographing lens, so a red component in a light ray of the galaxy N that arrives at an imaging element is greatly reduced. When the galaxy N is observed with the naked eye using, for example, a telescope, the galaxy N appears as a dark red color. However, when usual image-processing is performed, a live view image of the galaxy N is displayed in light red.

FIG. 7 illustrates a region division of the live view image of FIG. 6. The image is divided into blocks each corresponding to a predetermined region. FIG. 7 illustrates an example of dividing an image into 72 blocks with eight in the vertical direction and nine in the horizontal direction. 1 to 72 represent block numbers (block No.) The shape of the galaxy N illustrated in FIG. 6 is represented by a dotted line.

FIG. 8 illustrates an average brightness value of each block that is displayed on the region division diagram of FIG. 7. The average brightness value of each block is calculated by the analysis range indicating section 23. The number displayed on a block represents a calculated brightness value. The brightness value is represented with 8 bits, and is a value between 0 and 255. Here, it is assumed that the predetermined brightness value that has been set in advance is "100". A block having an average brightness value that is not less than 100 is shaded. There are thirteen high brightness blocks.

FIG. 9 illustrates an area of a high brightness block that is displayed on the region division diagram of FIG. 7. A high brightness block is shaded in the region division diagram of FIG. 7. A block No. 14 to a block No. 16, a block No. 22 to a block No. 25, a block No. 31 to a block No. 34, and a block No. 41 and a block No. 42 are high brightness blocks. Blocks in which a portion of the star M and/or a portion of the galaxy N exists are high brightness blocks. These blocks are set to be an analysis range.

Return to FIG. 5. The color analysis section 24 performs color analysis by analyzing a color included in the analysis range set by the analysis range indicating section 23 (Step S106).

Figures 10A, 10B:
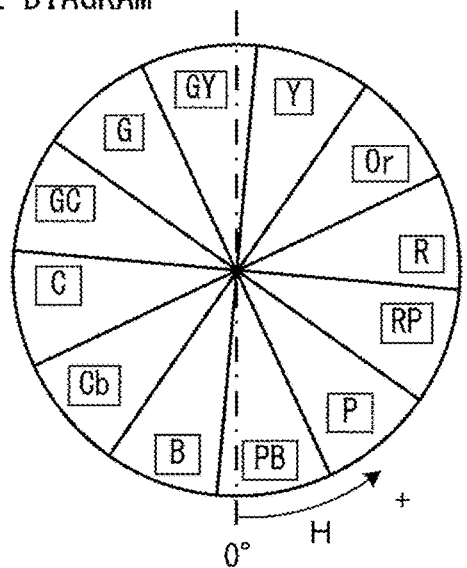
FIGS. 10A and 10B are diagrams for explaining an HS plane in an HSV color space.

Here, an example of a hue (H) analysis performed by the color analysis section 24 is briefly described. FIGS. 10A and 10B are diagrams for explaining an HS plane in an HSV color space. A hue diagram in FIG. 10A is an example of an HS plane in an HSV color space, and indicates a hue (H) range. The hue (H) is defined in a circumferential direction, and the saturation (S) is defined in a radial direction. As indicated in the hue diagram, H is defined by a counterclockwise angle, with the downward y-axis being 0° (a starting point). The hue diagram is an example in which hues are classified into twelve colors in total, including Y (yellow), Or (orange), R (red), RP (red purple), P (purple), PB (purple blue), B (blue), Cb (green blue), C (cyan), GC (blue green), G (green), and GY (yellow green). A hue range table in FIG. 10B includes an H range (angle) for each hue (12 colors) in the hue diagram.

When data of each pixel is in the RGB format, the color analysis section 24 calculates the H of each pixel in image data using the following formulas, so as to obtain a hue (H).

When the maximum value among R, G, and B is MAX and the minimum value among R, G, and B is MIN, $H=0$ when MIN=MAX $H=(60\times(G-R)/(MAX-MIN))+60$ when MIN=$B$ $H=(60\times(B-G)/(MAX-MIN))+180$ when MIN=$R$ $H=(60\times(R-B)/(MAX-MIN))+300$ when MIN=$G$ The hue (H) is hereinafter also referred to as color for simplification. The number of colors to be analyzed is not limited to twelve.

FIGS. 11A to 11C and 12 illustrate an example of color analysis performed by the color analysis section 24. An area of a high brightness block that is illustrated in FIG. 11A indicates an analysis range (a high brightness block) to be color-analyzed, and is obtained by superimposing the galaxy N on the diagram of FIG. 9. In this example, an example of color-analyzing the block No. 24 and the block No. 42 that are representative of the thirteen high brightness blocks is described.

For example, the color analysis section 24 further divides each block into regions to be color-analyzed with eight in the vertical direction and nine in the horizontal direction, and calculates a color that is representative of each region on the basis of captured-image data. A color analysis diagram (No. 24) illustrated in FIG. 11B and a color analysis diagram (No. 42) illustrated in FIG. 11C are enlarged views of the block No. 24 and the block No. 42, respectively. The color analysis diagram (No. 24) and the color analysis diagram (No. 42) respectively indicate a result of color-analyzing the block No. 24 and a result of color-analyzing the block No. 42, and a representative color for each region is displayed on each of the diagrams.

In the block No. 24, R (red) and RP (red purple) are calculated as representative colors for the regions. In a region in which a portion of the star M exists, RP (red purple) is calculated as a representative color. In all of the regions in which a portion of the star M does not exist, R (red) is calculated as a representative color because they are regions in which a portion of the red galaxy N exists. The color of the galaxy N is light red (the saturation of the color is decreased), but this is a color based on red, R (red) is calculated as a representative color.

In an upper portion of the block No. 42, R (red) is calculated as a representative color for the regions because they are regions in which a portion of the red galaxy N exists. For some of the regions situated from the center to the right in the block No. 42, Or (orange) is calculated due to the star M. The regions in a lower portion of the block No. 42 are regions in which a portion of the red galaxy N or a portion of the star M does not exist, so B (blue) is calculated as a representative color. Likewise, a representative color is calculated by the color analysis section 24 in a high brightness block other than the blocks No. 24 and No. 42. In the example illustrated in FIGS. 11A to 11C, representative colors are calculated for 936 regions (13×8×9=936).

FIG. 12 is an analysis result table in which a total number of regions for which a representative color has been calculated in the high brightness block diagram illustrated in FIG. 11A is given for each color. It is assumed that four types of colors, including R (red), B (blue), RP (red purple), and Or (orange), are calculated. The number of regions for which red has been calculated is largest because an area of the red galaxy N has been set as an analysis range.

Return to FIG. 5. After the color analysis (Step S106) is completed, or when it has been determined that the color analysis has been performed (YES in Step S100), the controller 21 determines whether there is a high brightness portion (a high brightness block) (Step S108). When the controller 21 has determined that there are no high brightness portions (NO in Step S108), the controller 21 determines that special image-processing is not to be performed, and performs usual image-processing (Step S122). After that, the process returns to the flowchart of FIG. 4.

When the controller 21 has determined that there is a high brightness portion (YES in Step S108), the color correction instructing section 25 instructs the image generator 50 to perform a color correction on the captured-image data, on the basis of a result of the color analysis (Step S110). Specifically, on the basis of the color analysis result, the color correction instructing section 25 refers to a color correction table so as to set a color to be corrected and a correction amount, and instructs the image generator 50 to perform a color correction.

Figure 13:
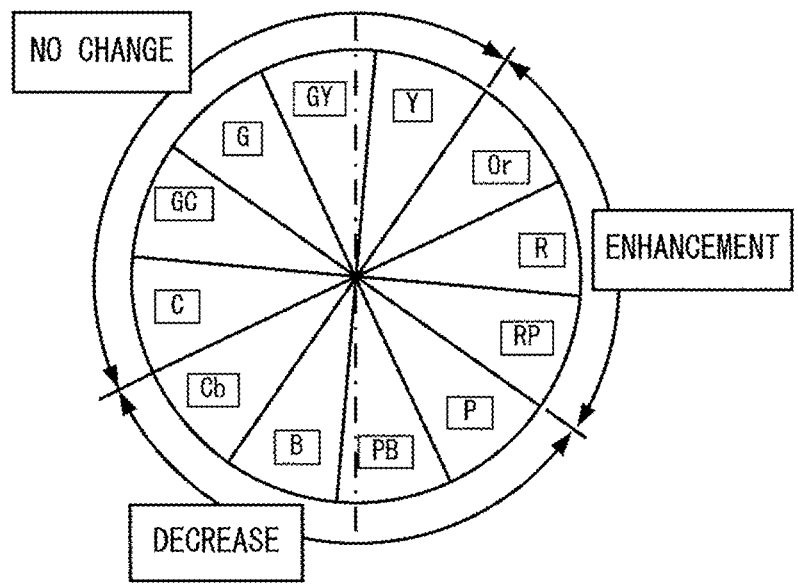
FIG. 13 illustrates a hue diagram in which a color group whose saturation is to be enhanced and a color group whose saturation is to be decreased are indicated.

In the example of FIG. 12, the number of regions for which R (red) has been calculated is largest, which is obtained by a result of the color analysis, so the color correction instructing section 25 selects, from color correction tables stored in the ROM 40, a color correction table that makes it possible to accentuate R (red). FIG. 13 illustrates a hue diagram in which a color whose saturation is to be enhanced and a color whose saturation is to be decreased when there is a need to reproduce a color in the red range upon astrophotographing are indicated. It is recommended that the saturations of Or, R, and RP be enhanced, and the saturations of P, PB, and B be decreased. For example, a color correction table that corresponds to a state illustrated in FIG. 13 is selected as a color correction table that makes it possible to accentuate R (red).

Further, the color correction instructing section 25 may select a color correction table that makes it possible to accentuate the top two (or three) colors in number of regions, according to the top two (or three) colors in number of regions in the analysis result table. In the example of FIG. 12, a color correction table is selected that makes it possible to accentuate R (red) and B (blue) in the case in which the top two colors is to be accentuated. Alternatively, the color correction instructing section 25 may generate a color correction table that makes it possible to accentuate the top two colors (for example, R (red) and B (blue)). In this case, the color correction instructing section 25 may select, on the basis of the hue diagram, a color group whose saturation is to be enhanced and a color group whose saturation is to be decreased, as illustrated in FIG. 13, so as to generate a color correction table.

When there is not a color whose number of regions for which the color has been calculated accounts for 30% or more of a total number of regions in the analysis result table illustrated in FIG. 12, the color correction instructing section 25 may determine that there are not any specific colors so as to not perform a color correction.

A color correction table 1 illustrated in FIG. 14A and a color correction table 2 illustrated in FIG. 14B are specific examples of color correction tables. The color correction table 1 and the color correction table 2 are color correction tables for astrophotographing that are used when there is a need to reproduce a color in the red range. The saturations of four colors, including Or, R. RP, and B, are corrected using the color correction table 1 and the color correction table 2.

In the color correction table 1, a correction amount is set for the saturation of a specific color (Or, R, RP, B) regardless of an average brightness value of a high brightness block detected in Step S102. "+" represents a saturation enhancement, and "−" represents a saturation decrease. For example, the correction amount is set to "saturation value+2" with respect to Or and R. In other words, a correction is set that increases the saturation value by two. Conversely, the correction amount is set to "saturation value−1" with respect to B. In other words, a correction is set that decrease the saturation value by one. No correction is performed on colors other than Or, R, RP, and B.

In the color correction table 2, different correction amounts are set for the saturation of a specific color (Or, R, RP, B) depending on an average brightness value of a high brightness block detected in Step S102. For example, with respect to Or and R, the correction amount is set to "saturation value+2" for a block having an average brightness value between 100 and 149. Further, with respect to Or and R, the correction amount is set to "saturation value+1" for a block having an average brightness value not less than 150. In a block with a large brightness value, recognition of a color can be improved even if the value of a saturation enhancement is small. However, in a block with a small brightness value, there is a possibility that recognition of a color will not be sufficiently improved unless the value of a saturation enhancement is made larger. Such a saturation enhancement makes it possible to accentuate a color, which results in improving recognition of a subject.

Further, with respect to B, the value of a saturation decrease is made larger in a block with a large brightness value ("saturation value−2"). This provides the advantage of further improving recognition of Or and R relatively. The specific colors and the correction amounts given in the color correction table illustrated in FIG. 14 are examples. Further, the specific colors and the correction amounts given in the color correction table may be set discretionally by a photographer.

Return to FIG. 5. The image generator 50 determines whether a correction range has been indicated by the color-correction-range indicating section 26 (Step S112). As described above, for example, when the D-pad 90b (or a touch panel) has been manipulated by a photographer, the color-correction-range indicating section 26 indicates, to the image generator 50 and as a correction range, a range in which the manipulation has been performed through the D-pad 90b. When the image generator 50 has determined that the correction range has been indicated by the color-correction-range indicating section 26 (YES in Step S112), the image generator 50 refers to a color correction table so as to perform a color correction on the indicated correction range in the captured-image data (Step S114).

When the image generator 50 has determined that the correction range has not been indicated by the color-correction-range indicating section 26 (NO in Step S112), the image generator 50 determines whether the correction range has been automatically set (Step S116). Even if the correction range has not been indicated by the color-correction-range indicating section 26, when the correction range has been automatically set (YES in Step S116), the image generator 50 determines, as a correction range, an analysis range (a high brightness block) indicated by the analysis range indicating section 23, and refers to a color correction table so as to perform a color correction with respect to the captured-image data (Step S118).

The image generator 50 has determined that the correction range has not been automatically set (NO in Step S116), the image generator 50 refers to a color correction table so as to perform a color correction over an entire range of a screen (Step S120). After Step S114, S118, or S120 is performed, the process returns to Step S24 of FIG. 4.

The controller 21 displays an image (Step S24). When usual image-processing is performed, an image obtained by performing usual image-processing is displayed on the display 80 as a live view image, and when special image-processing is performed, a corrected image is displayed on the display 80 as a live view image. The controller 21 determines whether a power-off manipulation has been performed by the photographer (Step S26). When the controller 26 has determined that no power-off manipulation has been performed (NO in Step S26), the process returns to Step S12. When the controller 21 has determined that the power-off manipulation has been performed (YES in Step S26), the controller 26 resets the flag indicating "color-analyzed" (C flag) (0) (Step S28) and terminates the processing.

FIGS. 15A and 15B schematically illustrate effects of a color correction. LV1 of FIG. 15A is a live view image before a color correction that is the same as the live view image of FIG. 6, and LV2 of FIG. 15B is a live view image after a color correction. The saturation of red (R) of the galaxy N is enhanced, and the saturation of blue (B) around red (R) of the galaxy N is decreased, so as to recognize red (R) of the galaxy N clearly. Further, the saturations of Or ad RP are also enhanced, so as to improve recognition of the star M.

<Microscope Photographing Mode>

The example of color correction processing performed when astrophotographing is performed has been described with reference to FIGS. 6 to 15B. In the following description, an example of color correction processing performed when microscope photographing is performed is described. For example, when microscope photographing is performed, the image capturing apparatus 1 optimized for a microscope is mounted on a microscope. Further, the image capturing apparatus 1 for a microscope may be an image-capturing system in which a camera head (corresponding to the image capturing section 10 illustrated in FIG. 2) that is mounted on a microscope, and a controller (corresponding to the sections illustrated in FIG. 2 other than the image capturing section 10) that processes captured-image data output from the camera head are separately provided, or the display 80 may be a separate display device.

Figure 16:
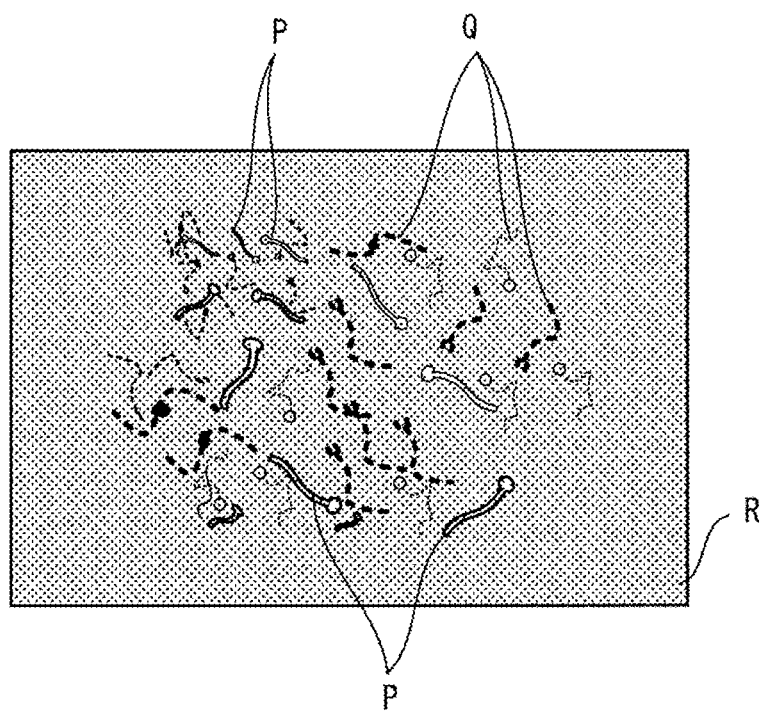
FIG. 16 illustrates an example of a live view image captured when microscope photographing is performed.

FIG. 16 illustrates an example of a live view image captured when microscope photographing is performed. Here, there are a sample P and a sample Q on a screen and the sample P is an observation target. The color of the sample P is GY (yellow green), the color of the sample Q is PB (purple blue), and the color of a background R is B (blue). The sample P that is an observation target is not sufficiently clearly recognized on the screen.

Figure 17:
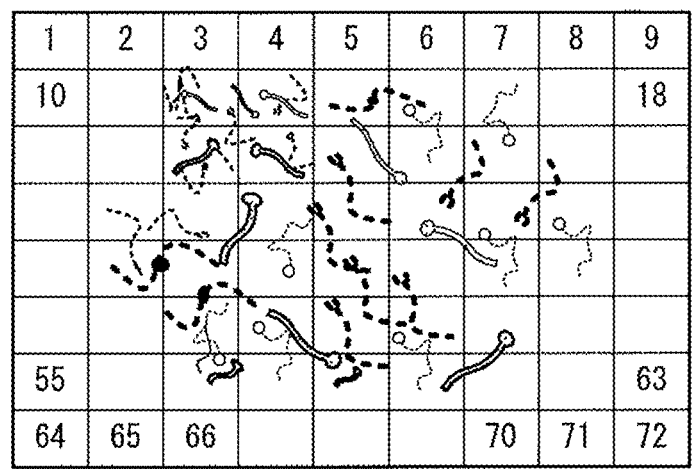
FIG. 17 illustrates a region division of the live view image of FIG. 16.

FIG. 17 illustrates a region division of the live view image of FIG. 16 that is captured when microscope photographing is performed. As in the example of FIG. 8, the image is divided by the analysis range indicating section 23 into 72 blocks with eight in the vertical direction and nine in the horizontal direction. 1 to 72 represent block numbers. The description of a block number is partially omitted.

FIG. 18A illustrates an average brightness value of each block that is displayed on the region division diagram of FIG. 17. As described above, the average brightness value of each block is calculated by the analysis range indicating section 23. The number displayed on a block represents a brightness value. The brightness value is represented with 8 bits, and is a value between 0 and 255. Here, it is assumed that the block having a brightness value that is not less than 31 is a high brightness block. Further, high brightness blocks are classified into a group of blocks having an average brightness value "between 31 and 40" and a group of blocks having an average brightness value "not less than 41", and the groups of blocks are shaded using different types of patterns. FIG. 18B illustrates a brightness value table in which a relationship between a type of pattern of a shaded portion and an average brightness value in the region division diagram is given.

Figures 19A, 19B, 19C:
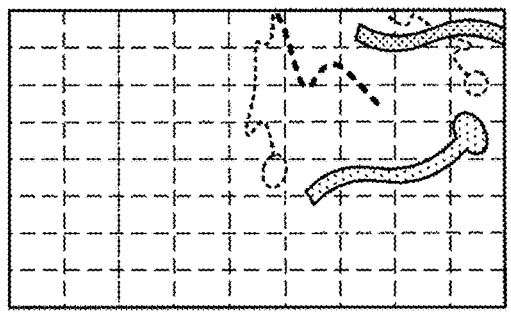
FIGS. 19A to 19C illustrate color analysis performed with respect to a high brightness block having an average brightness value between 31 and 40.

FIGS. 19A, 19B, and 19C illustrate a color analysis region and color analysis based on the diagram of an average brightness value of each block in FIG. 18A. The area of a high brightness block refers to an area of a high brightness block extracted by the analysis range indicating section 23. The area of a high brightness block is shaded. Blocks No. 12, No. 13, No. 26, . . . No. 60 are blocks having an average brightness value between 31 and 40. Blocks No. 14, No. 15, No. 16, . . . No. 61 are blocks having an average brightness value not less than 41. Blocks in which a portion of the sample P and a portion of the sample Q exists exhibit a high brightness. These blocks are set to be an analysis range by the analysis range indicating section 23. In this example, color analysis performed with respect to the block No. 57 and the block No. 59 is described as an example of color analysis, the block No. 57 and the block No. 59 being two of the high brightness blocks.

As in FIG. 11A, the color analysis section 24 further divides each block into regions to be color-analyzed with eight in the vertical direction and nine in the horizontal direction, and calculates a color that is representative of each region on the basis of captured-image data. The color analysis region (No. 57) illustrated in FIG. 19B is an enlarged view of the block No. 57 in FIG. 19A. As described above, the block No. 57 is a block having an average brightness value between 31 and 40.

The color analysis diagram (No. 57) illustrated in FIG. 19C indicates a result of color-analyzing the block No. 57. In the block No. 57, B (blue), PB (purple blue), and GY (yellow green) are calculated as representative colors for the regions.

Figures 20A, 20B:
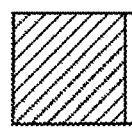
FIGS. 20A and 20B are diagrams for explaining a result of the color analysis with respect to a high brightness block having an average brightness value between 31 and 40.

FIG. 20A illustrates a portion of the brightness value table of FIG. 18B. FIG. 20B is a table in which a result of color-analyzing blocks having an average brightness value between 31 and 40 (the blocks No. 12, No. 13, No. 26, . . . No. 60) is given. When a total number of regions for which a representative color has been analyzed in a block having an average brightness value between 31 and 40 is calculated for each color, 300 regions for B (blue), 200 regions for GY (yellow green), and 148 regions for PB (purple blue) are obtained.

FIGS. 21A, 21B, and 21C illustrate a color analysis region and color analysis with respect to a high brightness block having an average brightness value not less than 41. The block No. 59 is described as a representative of a high brightness block having an average brightness value not less than 41. The color analysis region (No. 59) illustrated in FIG. 21B is an enlarged view of the block No. 59 in FIG. 21A. The color analysis diagram (No. 59) illustrated in FIG. 21C indicates a result of color-analyzing the block No. 59. B (blue), PB (purple blue), and GY (yellow green) are calculated as representative colors for the regions.

FIG. 22A is a portion of the brightness value table of FIG. 18B. FIG. 22B is a table in which a result of color-analyzing blocks having an average brightness value not less than 41 (the blocks No. 14, No. 15, No. 16, . . . No. 61) is given. When a total number of regions for which a representative color has been analyzed in a block having an average brightness value not less than 41 is calculated for each color, 1000 regions for B (blue), 600 regions for GY (yellow green), and 272 regions for PB (purple blue) are obtained.

FIGS. 23A and 23B illustrate examples of color correction tables that are used when microscope photographing is performed. FIG. 23A illustrates a color correction table 3 and FIG. 23B illustrates a color correction table 4. The color correction tables 3 and 4 are examples of a color correction table that is used when a photographer has specified GY in advance as a color to be accentuated. The color correction tables 3 and 4 are tables that make it possible to vary, according to an average brightness value of a block, the saturation of a color to be accentuated.

In the color correction table 3, the correction amount is set to "saturation value+1" in a block having an average brightness value between 31 and 40 with respect to GY, and the correction amount is set to "saturation value+2" in a block having an average brightness value not less than 41 with respect to GY.

In the color correction table 4, the correction amount is set to "saturation value+2" in a block having an average brightness value between 31 and 40 with respect to GY, and the correction amount is set to "saturation value+1" in a block having an average brightness value not less than 41 with respect to GY. In the color correction tables of this example, colors other than GY are not corrected.

FIGS. 24A, 24B, and 24C schematically illustrate effects in a corrected image when microscope photographing is performed. A live view image LV10 of FIG. 24A is a live view image before correction, and is an enlarged view of four blocks (the blocks No. 12, No. 13, No. 21, and No. 22) of the live view image illustrated in FIG. 17. The sample P whose portion exists in the blocks No. 12 and No. 13 having an average brightness value between 31 and 40 is referred to as a sample P1. The sample P whose portion exists in the blocks No. 21 and No. 22 having an average brightness value not less than 41 is referred to as a sample P2.

FIG. 24B illustrates effects of a color correction in a live view image LV11 by the color correction table 3. In other words, the live view image LV11 is an image obtained by correcting the live view image LV10 by use of the color correction table 3. The saturation value of the color of the sample P1 is increased by one. The saturation value of the color of the sample P2 is increased by two, the brightness value of the sample P2 being greater than the brightness value of the sample P1.

FIG. 24C illustrates effects of a color correction in a live view image LV12 by the color correction table 4. In other words, the live view image LV12 is an image obtained by correcting the live view image LV10 by use of the color correction table 4. A color correction is performed with respect to the sample P1 such that the saturation value is increased by two, and a color correction is performed with respect to the sample P2 such that the saturation value is increased by one. A photographer may compare the image corrected using the color correction table 3 with the image corrected using the color correction table 4 and select a color correction table that makes it possible to improve recognition of an entire image.

<Effects>

The usage of a removable infrared cutoff filter provides an advantage when astrophotographing is performed, but this makes the structure of a camera more complicated and causes an increase in costs. For example, also in the field of measurement, there is a demand for an improvement of recognition of a specific subject by accentuating a color of the specific subject, in addition to the improvement of recognition of the color of H-alpha light (red) when astrophotographing is performed. It is difficult to meet such a demand just by providing a removable infrared cutoff filter in a camera. According to the present embodiment, it is possible to provide an image processing apparatus that generates, from captured-image data, an image in which a specific color of a subject is accentuated. Specific effects are described below.

Color correction processing that accentuates colors of spectra of a star and a galaxy is performed in an astrophotographing mode, which results in also being able to recognize faint stars. Further, red of a galaxy that is cut off by an infrared cutoff filter is reproduced, so it is possible to capture an image in which a galaxy is red, using a commonly used digital camera.

According to the present embodiment, also in the field of measurement such as the field of microscope photographing, it is possible to perform photographing that makes it possible to accentuate a color of a specific microorganism or a specific sample. As a result, it becomes possible to easily recognize a specific microorganism or a specific sample that is not easily distinguished from, for example, the background when usual photographing is performed.

In the present embodiment, a color is extracted from a high brightness area on a screen, and the saturation of a color that occupies a large portion of the high brightness area is enhanced. Thus, it is possible to avoid accentuating a color of an unrelated subject or a color of background noise.

In the present embodiment, it is possible not only to enhance the saturation of a color of a specific sample but also to decrease the saturation of a color other than the color of the specific sample. This results in being able to more clearly recognize a specific sample on a screen.

In the present embodiment, various color correction tables are provided, so it is possible to select an appropriate condition for a color correction according to an actual image.

Other Example

A color (a color to be accentuated) given in a color correction table may be set discretionally. For example, the controller 21 may analyze, using a color analysis section, a color of a sample when the sample is indicated by a photographer, and set, using a color correction section, the analyzed color to be a color to be accentuated.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS 1 image capturing apparatus
10 image capturing section
20 CPU
21 controller
23 analysis range indicating section
24 color analysis section
25 color correction instructing section
26 color-correction-range indicating section
30 SDRAM
40 ROM
50 image generator
60 image input section
70 nonvolatile memory
80 display
90 operation section
100 image processing apparatus

What is claimed is:

1. An image processing apparatus comprising:
a central processor or hardware circuitry that
indicates a first range as an analysis range, the first range having a brightness higher than a predetermined brightness from among the plurality of first ranges obtained by dividing a screen on the basis of captured-image data,
analyzes a color included in the indicated analysis range and outputs a result of the color analysis, and
gives an instruction to perform a color correction, on the basis of the color analysis result; and
an image generator that performs a usual image-processing on the captured-image data when the central processor or hardware circuitry does not indicate the first range and that corrects the captured-image data on the basis of the color correction instruction, so as to generate a corrected image when the central processor or hardware circuitry indicates the first range.

2. The image processing apparatus according to claim 1, wherein the central processor or hardware circuitry refers to a color correction table so as to set a color to be corrected and a correction amount on the basis of the color analysis result, and gives an instruction to perform the color correction.

3. The image processing apparatus according to claim 2, wherein the central processor or hardware circuitry selects, from the color correction table, a color correction parameter according to a photographing mode when an image of captured-image data is captured.

4. The image processing apparatus according to claim 1, wherein the central processor or hardware circuitry gives an instruction to perform the color correction by enhancing a saturation of the color to be corrected.

5. The image processing apparatus according to claim 1, wherein the central processor or hardware circuitry gives an instruction to perform the color correction by decreasing a saturation of the color to be corrected.

6. The image processing apparatus according to claim 1, wherein the image generator performs the color correction on an analysis range, in the captured-image data, that is indicated by the central processor or hardware circuitry.

7. The image processing apparatus according to claim 6, wherein, according to a difference in brightness, the central processor or hardware circuitry changes, in the analysis range, a saturation value of the color to be corrected.

8. The image processing apparatus according to claim 1, wherein the image generator performs the color correction over an entire range in the captured-image data.

9. The image processing apparatus according to claim 1, wherein the central processor or hardware circuitry further indicates a color correction range on which a color correction is to be performed, wherein
  according to the color correction instruction, the image generator performs a correction on the indicated color correction range in the captured-image data, so as to generate the corrected image.

10. An image capturing apparatus comprising:
  the image processing apparatus according to claim 1; and
  a controller that controls an operation of the image processing apparatus, wherein
  the controller operates the image processing apparatus when at least one of an astrophotographing mode and a microscope photographing mode is set to be a photographing mode.

11. The image processing device of claim 1 wherein the central processor or hardware circuitry divides the screen into a plurality of regions,
  wherein the central processor or hardware circuitry defines the analysis range as including only those of the plurality of regions having a brightness higher than the predetermined brightness, and
  wherein the image generator corrects the captured-image data on the basis of the color correction instruction on only those of the plurality of regions included in the analysis range.

12. An image processing method comprising:
  indicating a first range as an analysis range, the first range having a brightness higher than a predetermined brightness from among the plurality of first ranges obtained by dividing a screen on the basis of captured image data;
  analyzing a color included in the indicated analysis range and outputting a result of the color analysis;
  giving an instruction to perform a color correction, on the basis of the color analysis result;
  performing a usual image-processing on the captured-image data when the first range is not indicated; and
  correcting the captured-image data on the basis of the color correction instruction when the first range is indicated, so as to generate a corrected image.

13. A non-transitory computer-readable medium storing a computer program for causing a computer of an image capturing apparatus to perform image processing, the image processing comprising:
  indicating a first range as an analysis range, the first range having a brightness higher than a predetermined brightness from among the plurality of first ranges obtained by dividing a screen on the basis of captured image data;
  analyzing a color included in the indicated analysis range and outputting a result of the color analysis;
  giving an instruction to perform a color correction, on the basis of the color analysis result;
  performing a usual image-processing on the captured-image data when the first range is not indicated; and
  correcting the captured-image data on the basis of the color correction instruction, so as to generate a corrected image when the first range is indicated.

* * * * *